(12) United States Patent
Wang (10) Patent No.: US 11,522,668 B2
(45) Date of Patent: Dec. 6, 2022

(54) RECEIVER CIRCUIT AND METHOD CAPABLE OF ACCURATELY ESTIMATING TIME OFFSET OF SIGNAL

(71) Applicant: Realtek Semiconductor Corp., HsinChu (TW)

(72) Inventor: Lihua Wang, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/367,410

(22) Filed: Jul. 4, 2021

(65) Prior Publication Data

US 2022/0123916 A1 Apr. 21, 2022

(30) Foreign Application Priority Data

Oct. 15, 2020 (CN) .......................... 202011104090.0

(51) Int. Cl.
*H04L 7/00* (2006.01)
*H04B 1/16* (2006.01)

(52) U.S. Cl.
CPC ............. *H04L 7/0079* (2013.01); *H04B 1/16* (2013.01); *H04L 7/0016* (2013.01)

(58) Field of Classification Search
CPC ....... H04L 7/00; H04L 7/0016; H04L 7/0079; H04L 7/0054; H04B 1/16
See application file for complete search history.

(56) References Cited

U.S. PATENT DOCUMENTS

| | | | | |
|---|---|---|---|---|
| 6,711,221 | B1 * | 3/2004 | Belotserkovsky | .. H04L 27/2675 375/343 |
| 7,447,282 | B2 * | 11/2008 | Galperin | ............. H04L 27/2662 375/343 |
| 7,558,245 | B2 * | 7/2009 | Laroia | ................. H04L 27/2665 375/316 |

FOREIGN PATENT DOCUMENTS

| | | |
|---|---|---|
| CN | 102710562 A | 10/2012 |
| CN | 110855595 A | 2/2020 |

\* cited by examiner

*Primary Examiner* — Betsy Deppe
(74) *Attorney, Agent, or Firm* — Winston Hsu (57) ABSTRACT

A method applicable to a receiver circuit, including: performing a cross-correlation operation upon at least one time-domain signal on at least one receiver path of the receiver circuit according to a local sequence signal, to estimate at least one time offset amount of the at least one time-domain signal as at least one time offset compensation amount; and, performing time offset compensation upon the at least one time-domain signal on the at least one receiver path according to the at least one time offset compensation amount.

14 Claims, 7 Drawing Sheets

RECEIVER CIRCUIT AND METHOD CAPABLE OF ACCURATELY ESTIMATING TIME OFFSET OF SIGNAL

BACKGROUND OF THE INVENTION

1. Field of the Invention

The present invention is related to a time offset estimation mechanism, and more particularly, to a method for estimating a time offset of a receiver circuit and associated apparatus.

2. Description of the Prior Art

Generally speaking, crystal oscillation frequencies of a traditional transmitter circuit and a traditional receiver circuit are not exactly the same, which will cause a frequency offset and a time offset in the signal received by the traditional receiver circuit. If the clock signal of the carrier signal and the clock signal used for signal sampling are generated from the same clock source, the time offset may be compensated according to the result of the frequency offset. On the contrary, if the two clock signals are generated from different clock sources, then the time offset may not be compensated according to the result of the frequency offset, and the time offset must be estimated separately. Therefore, when the clock signals are generated from the same clock source, the traditional method needs to generate a more accurate time offset estimation value according to the frequency offset estimation result. When the clock signals are generated from different clock sources, the traditional method needs to directly estimate the time offset, and this time offset estimation result is very susceptible to synchronization accuracy, that is, once the synchronization has an offset, the time offset estimation value is also inaccurate.

SUMMARY OF THE INVENTION

It is therefore an objective of the present invention to provide a receiver circuit and a method applicable to the receiver circuit, in order to solve the problem that the traditional mechanism may not effectively estimate the time offset.

According to an embodiment of the present invention, a receiver circuit is provided. The receiver circuit comprises an estimation circuit and a time offset compensation circuit. The estimation circuit is arranged to perform a cross-correlation operation upon at least one time-domain signal on at least one receiver path of the receiver circuit according to a local sequence signal, to estimate at least one time offset amount of the at least one time-domain signal as at least one time offset compensation amount. The time offset compensation circuit is coupled to the estimation circuit, and is arranged to perform time offset compensation upon the at least one time-domain signal on the at least one receiver path according to the at least one time offset compensation amount.

According to an embodiment of the present invention, a method applicable to a receiver circuit is provided. The method includes: performing a cross-correlation operation upon at least one time-domain signal on at least one receiver path of the receiver circuit according to a local sequence signal, to estimate at least one time offset amount of the at least one time-domain signal as at least one time offset compensation amount; and performing time offset compensation upon the at least one time-domain signal on the at least one receiver path according to the at least one time offset compensation amount.

The advantage of the embodiment of the present invention is that the time offset may be accurately estimated without using or referring to the result of frequency offset estimation. In addition, it does not rely on the accuracy of signal synchronization, that is, even if the signal synchronization is not accurate, the embodiment of the present invention may still accurately estimate the time offset.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
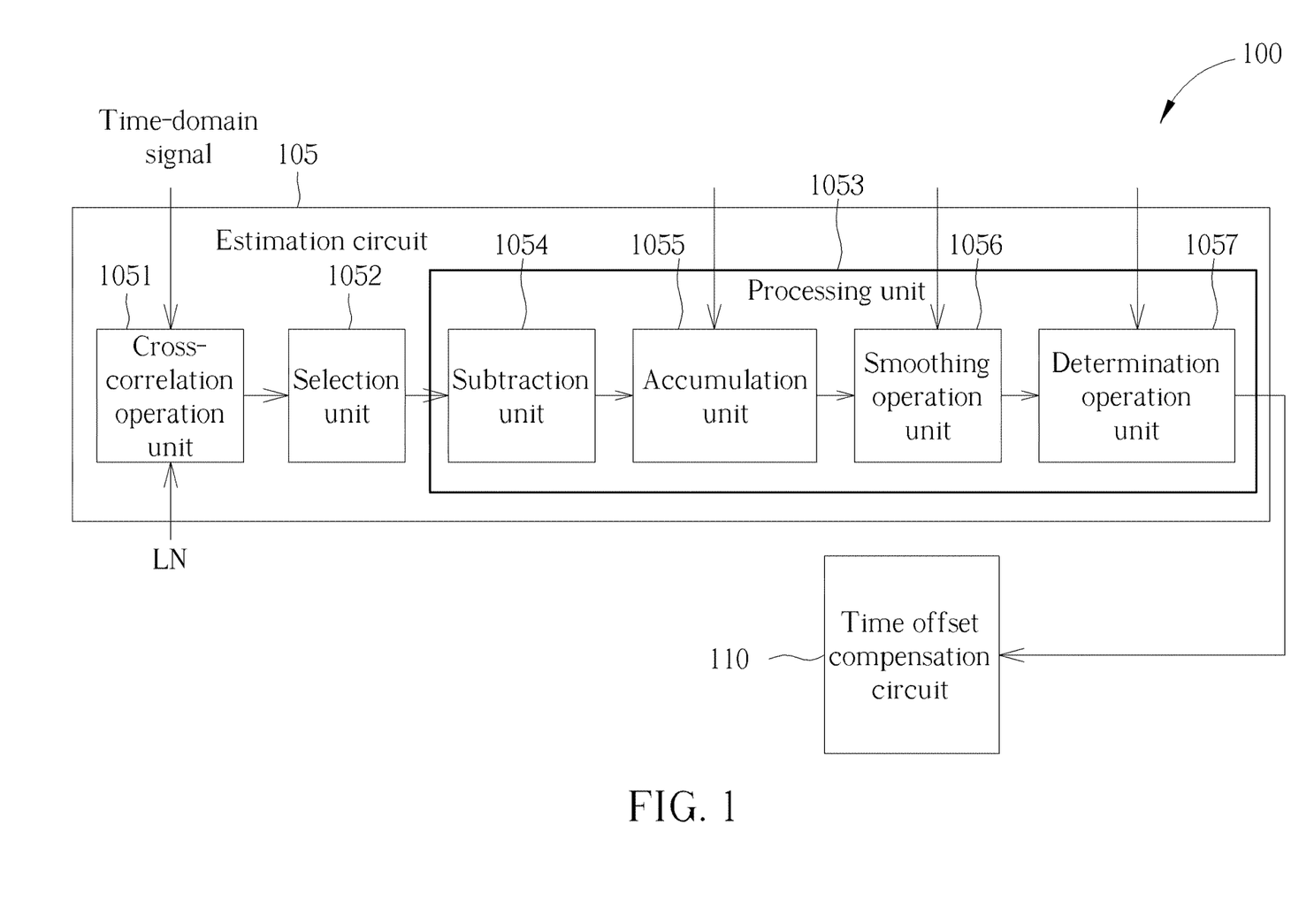
FIG. 1 is a block diagram illustrating an estimation circuit applicable to a receiver circuit according to an embodiment of the present invention.

The objective of the present invention is to provide a method capable of accurately estimating a time offset of a signal passing through one or more receiver paths of a receiver circuit based on local sequence technology and associated apparatus. Please refer to FIG. 1. FIG. 1 is a block diagram illustrating an estimation circuit 105 applicable to a receiver circuit 100 according to an embodiment of the present invention. The receiver circuit 100 at least comprises the estimation circuit 105 and a time offset compensation circuit 110. The estimation circuit 105 is arranged to estimate time offset amount(s) of receiver path(s) of the receiver circuit 100, and the time offset compensation circuit 110 is arranged to compensate time offset(s) of receiver path(s) according to time offset amount(s) estimated by the estimation circuit 105. The estimation circuit 105 comprises a cross-correlation operation unit 1051, a selection unit 1052, and a processing unit 1053, wherein the processing unit 1053 comprises a subtraction unit 1054, an accumulation unit 1055, a smoothing operation unit 1056, and a determination operation unit 1057. It should be noted that each of the above-mentioned units may be implemented by a pure hardware circuit, a mixed software and hardware circuit module, or a pure software module.

When the baseband signal is processed, the receiver circuit 100 performs synchronization operation processing upon time-domain signal(s) of one or more receiver paths received by the receiver circuit 100, and then finds or identifies a symbol boundary for the time-domain signal (s) of one or more receiver paths. For a time-domain signal of each receiver path, the cross-correlation operation unit 1051 distinguishes different symbols in the time-domain signal according to the found symbol boundary, and according to the unit time of each symbol taken as a minimum time offset estimation processing unit, performs a cross-correlation operation upon the time-domain signal level of multiple chips or bits respectively included in one or more symbols in the received time-domain signal and the signal level of multiple bits of a local sequence signal LN, to generate one or more cross-correlation operation result signals. For example, for a symbol comprising multiple bits, the cross-correlation operation unit 1051 multiplies the signal level value respectively corresponding to each bit of the symbol by each signal level value respectively corresponding to each bit of the local sequence signal LN, and performs respective accumulation to generate each cross-correlation operation result value of the cross-correlation operation result signal. Therefore, a cross-correlation operation result signal comprises, for example, N cross-correlation operation result values. Then an absolute value operation is respectively performed upon the N cross-correlation operation result values of the cross-correlation operation result signal to generate an absolute value result signal of the cross-correlation operation. The absolute value result signal of the cross-correlation operation also comprises N cross-correlation operation absolute result values, wherein the N cross-correlation operation absolute result values respectively correspond to the $1^{st}$ to $N^{th}$ bits of the time sequence, that is, index 1 to index N.

For signal processing of a symbol, the estimation circuit 105 determines which type the current channel corresponds to. For example, the estimation circuit 105 confirms a time offset estimation model according to a waveform formed by multiple points (e.g. five continuous or discontinuous points) derived from sampling a signal response result of the channel, wherein the waveform corresponds to, for example, "Λ" type (or may be called "Λ" type), left "N" type, or right "N" type. In practice, if the channel is a Gaussian channel, the time offset estimation model is the "Λ" type, and the waveform formed by the connection of the N cross-correlation operation absolute result values is also "Λ" type. If the channel is a multi-path channel, the time offset estimation model is the left "N" type or the right "N" type, and the waveform formed by the connection of the N cross-correlation operation absolute result values may also be the left "N" type or the right "N" type.

Then, after confirming which of the "Λ" type, the left "N" type or the right "N" type that the time offset estimation model has, the selection unit 1052 finds a maximum peak value f(pk) from the N cross-correlation operation absolute result values and determines the value of a time index pk corresponding to the maximum peak value f(pk), and then finds two time indices pre, pst respectively before and after the time index pk and two cross-correlation operation absolute result values f(pre), f(pst) respectively corresponding to the two time indices pre, pst. In other words, in terms of time sequence, the time index pk is located between the two time indices pre, pst, and the maximum peak value f(pk) of the N cross-correlation operation absolute result values is larger than f(pre), f(pst). For example, the selection unit 1052 in one actual implementation may find a local maximum peak value as f(pre) before the time index pk and then find the time index pre of the local maximum peak value f(pre), and may find a local maximum peak value as f(pst) after the time index pk and then find the time index pst of the local maximum peak value f(pst), where the value of f(pre) may be larger than f(pst) or may be smaller than or equal to f(pst). Alternatively, in another embodiment, the selecting unit 1052 may determine a time index with a specific time difference (e.g. several time indices) before the time index pk as pre and find the value of f(pre) according the time index pre, and determine a time index with the specific time difference (e.g. several time indices) after the time index pk as pst and find the value of f(pst) according the time index pst. In other words, in the embodiment of the present invention, the time indices pre, pst and the values of f(pre) and f(pst) may be determined by various implementation variations, and the present invention is not limited thereto. Then the selected multiple cross-correlation operation absolute result values are outputted to the processing unit 1053.

Figure 2:
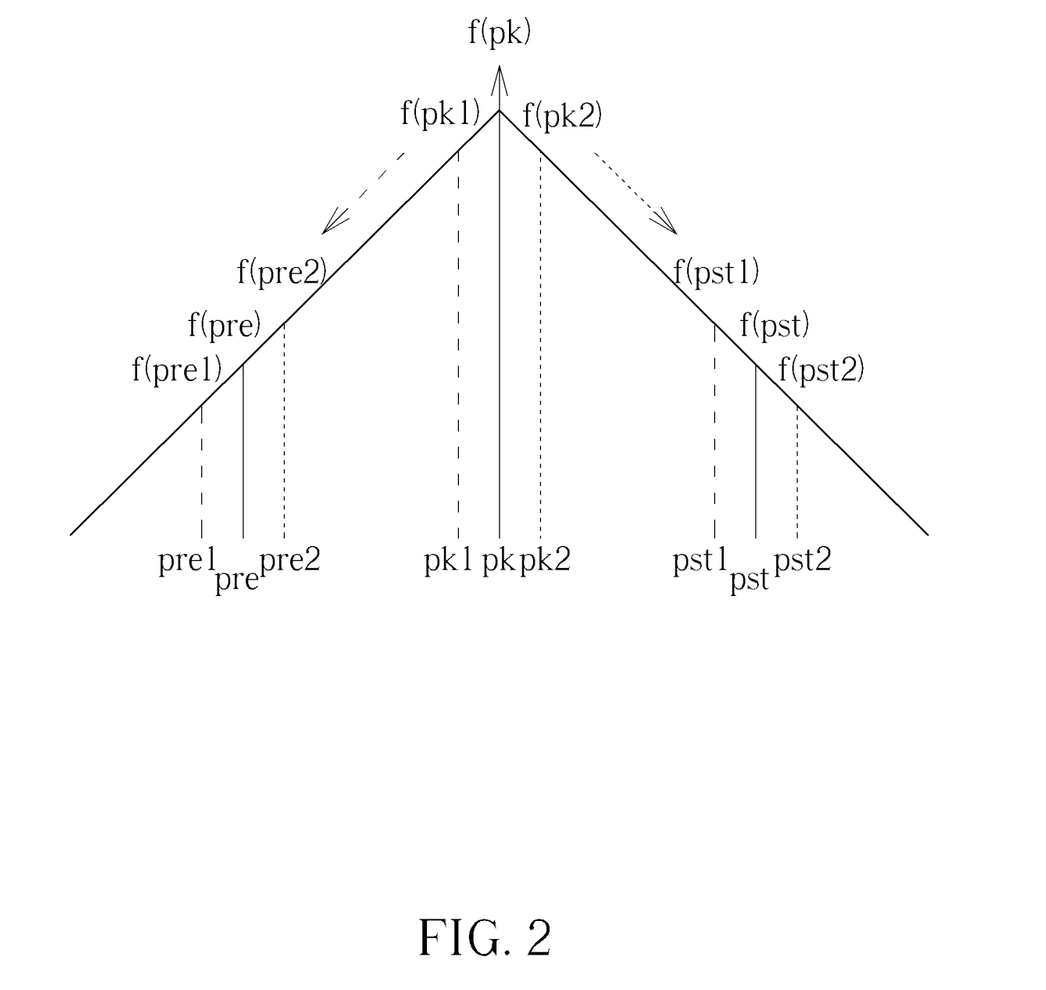
FIG. 2 is a diagram illustrating a relationship between the maximum peak value f(pk), the two cross-correlation operation absolute result values f(pre), f(pst), the time indices pk, pre, pst, and different time offset changes (positive time offset change and negative time offset change) when the time offset estimation model is the "Λ" type according to an embodiment of the present invention.
Figure 3:
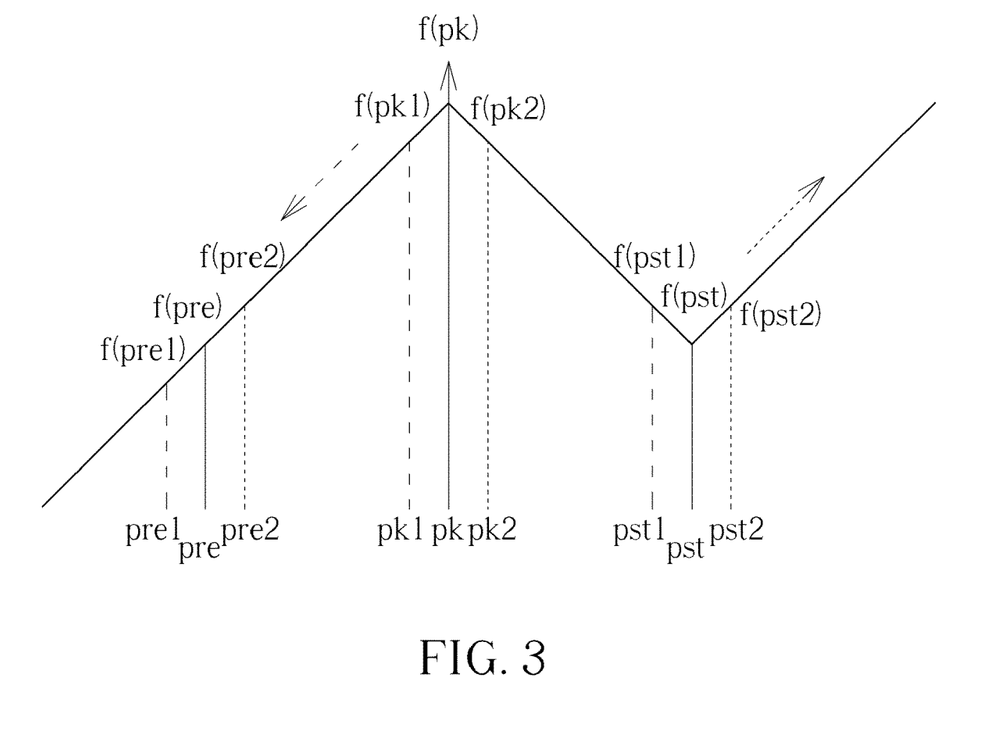
FIG. 3 is a diagram illustrating a relationship between the maximum peak value f(pk), the two cross-correlation operation absolute result values f(pre), f(pst), the time indices pk, pre, pst, and different time offset changes (positive time offset change and negative time offset change) when the time offset estimation model is the right "N" type according to an embodiment of the present invention.
Figure 4:
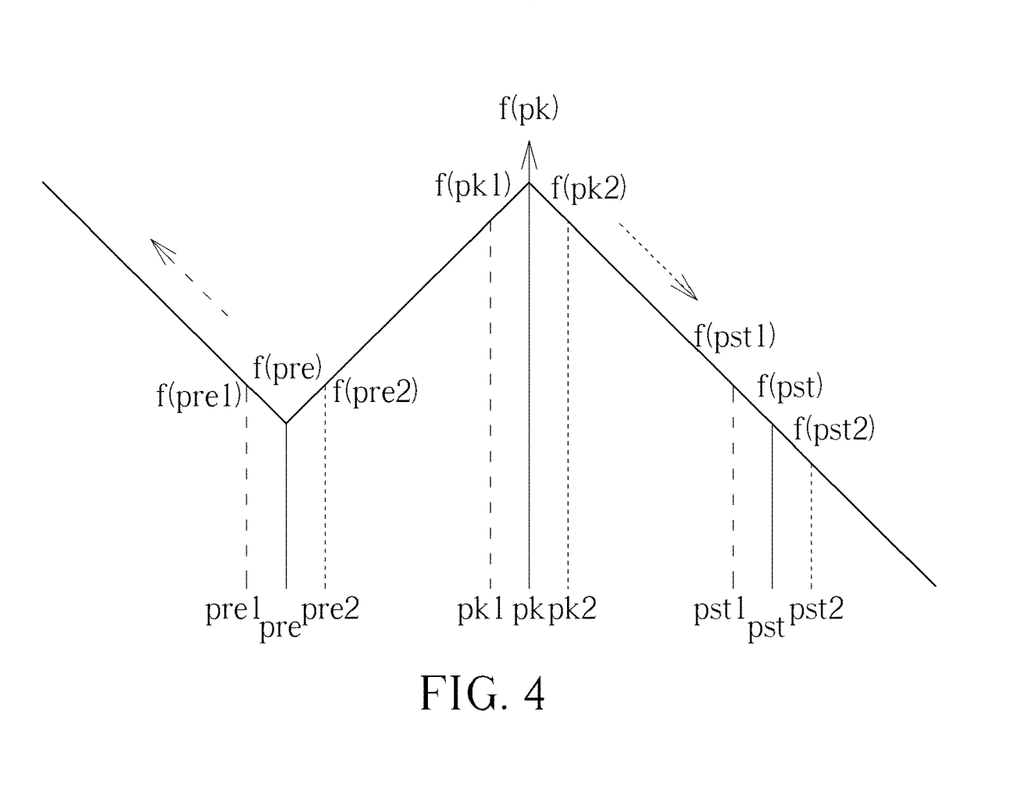
FIG. 4 is a diagram illustrating a relationship between the maximum peak value f(pk), the two cross-correlation operation absolute result values f(pre), f(pst), the time indices pk, pre, pst, and different time offset changes (positive time offset change and negative time offset change) when the time offset estimation model is the left "N" type according to an embodiment of the present invention.

Please refer to FIGS. 2, 3, and 4. FIG. 2 is a diagram illustrating a relationship between the maximum peak value f(pk), the two cross-correlation operation absolute result values f(pre), f(pst), the time indices pk, pre, pst, and different time offset changes (positive time offset change and negative time offset change) when the time offset estimation model is the "Λ" type according to an embodiment of the present invention. FIG. 3 is a diagram illustrating a relationship between the maximum peak value f(pk), the two cross-correlation operation absolute result values f(pre), f(pst), the time indices pk, pre, pst, different time offset changes (positive time offset change and negative time offset change) when the time offset estimation model is the right "N" type according to an embodiment of the present invention. FIG. 4 is a diagram illustrating a relationship between the maximum peak value f(pk), the two cross-correlation operation absolute result values f(pre), f(pst), the time indices pk, pre, pst, and different time offset changes (positive time offset change and negative time offset change) when the time offset estimation model is the left "N" type according to an embodiment of the present invention.

For the time offset estimation model being the "Λ" type as shown in FIG. 2, if the time offset estimation model has no time offset at present, the value of each time index pk corresponding to the maximum peak value f(pk) of the N cross-correlation operation absolute result values in each symbol remains unchanged, and the value of f(pk) is larger than the values of f(pre) and f(pst), and the value of f(pre) may be larger than the value of f(pst) or may be smaller than the value of f(pst). If the time offset estimation model starts to have a time offset, each time index pk respectively corresponding to the maximum peak value f(pk) of the N cross-correlation operation absolute result values in each symbol, the time index pre, and the time index pst move in the same direction (left or right). For example, as shown by the dashed line in FIG. 2, if the time offset estimation model starts to have a positive time offset, the determined time indices pk, pre, and pst all move to the left/forward (but not limited thereto) and move to the positions of pk1, pre1, and pst1, respectively, wherein the positions of pk1, pre1, and pst1 correspond to the cross-correlation operation absolute result values f(pk1), f(pre1), and f(pst1), respectively. At this time, the value of f(pst1) becomes larger, and the value of f(pre1) becomes smaller. As a result, the value of f(pst1)−f(pre1) becomes larger as the value of the positive time offset becomes larger. Conversely, as shown by the dotted line in FIG. 2, if the time offset estimation model starts to have a negative time offset, the time indices pk, pre, and pst all move to the right/back (but not limited thereto) and move to the positions of pk2, pre2, and pst2, respectively, wherein the positions of pk2, pre2, and pst2 correspond to the cross-correlation operation absolute result values f(pk2), f(pre2), and f(pst2), respectively. At this time, the value of f(pst2) becomes smaller, and the value of f(pre2) becomes larger. Therefore, at this time, the value of f(pst2)−f(pre2) becomes smaller and smaller as the negative time offset increases.

In addition, for the time offset estimation model being the right "N" type as shown in FIG. 3, if the time offset estimation model has no time offset at present, the value of each time index pk corresponding to the maximum peak value f(pk) of the N cross-correlation operation absolute result values in each symbol remains unchanged, and the value of f(pk) is larger than the values of f(pre) and f(pst), and the value of f(pre) may be larger than the value of f(pst) or may be smaller than the value of f(pst). If the time offset estimation model starts to have a time offset, each time index pk respectively corresponding to the maximum peak value f(pk) of the N cross-correlation operation absolute result values in each symbol, the time index pre, and the time index pst move in the same direction (left or right). For example, as shown by the dashed line in FIG. 3, if the time offset estimation model starts to have a positive time offset, the time indices pk, pre, and pst all move to the left and move to the positions of pk1, pre1, and pst1, respectively, wherein the positions of pk1, pre1, and pst1 correspond to the cross-correlation operation absolute result values f(pk1), f(pre1), and f(pst1), respectively. At this time, the value of f(pst1) becomes larger, and the value of f(pre1) becomes smaller. As a result, the value of f(pst1)−f(pre1) becomes larger as the value of the positive time offset becomes larger. Conversely, as shown by the dotted line in FIG. 3, if the time offset estimation model starts to have a negative time offset, the time indices pk, pre, and pst all move to the right and move to the positions of pk2, pre2, and pst2, respectively, wherein the positions of pk2, pre2, and pst2 correspond to the cross-correlation operation absolute result values f(pk2), f(pre2), and f(pst2), respectively. At this time, as the negative time offset increases, the value of f(pk2) becomes smaller, and the values of f(pre2) and f(pst2) become larger. In addition, the value of f(pst2)−f(pre2) may be positive or negative, and there is no obvious trend. However, although the value of f(pst2)−f(pk2) is initially negative, the value of f(pst2)−f(pk2) becomes larger as the negative time offset increases. Although the value of f(pre2)−f(pk2) is initially negative, the value of f(pre2)−f(pk2) also becomes larger as the negative time offset increases.

In addition, for the time offset estimation model being the left "N" type as shown in FIG. 4, if the time offset estimation model has no time offset at present, the value of each time index pk corresponding to the maximum peak value f(pk) of the N cross-correlation operation absolute result values in each symbol remains unchanged, and the value of f(pk) is larger than the values of f(pre) and f(pst), and the value of f(pre) may be larger than the value of f(pst) or may be smaller than the value of f(pst). If the time offset estimation model starts to have a time offset, each time index pk respectively corresponding to the maximum peak value f(pk) of the N cross-correlation operation absolute result values in each symbol, the time index pre, and the time index pst move in the same direction (left or right). For example, as shown by the dashed line in FIG. 4, if the time offset estimation model starts to have a positive time offset, the time indices pk, pre, and pst all move to the left and move to the positions of pk1, pre1, and pst1, respectively, wherein the positions of pk1, pre1, and pst1 correspond to the cross-correlation operation absolute result values f(pk1), f(pre1), and f(pst1), respectively. At this time, the value of f(pk) becomes smaller, and the values of f(pst1), f(pre1) become larger. Therefore, the value of f(pst1)−f(pre1) may be positive or negative, and there is no obvious trend. However, although the value of f(pst1)−f(pk1) is initially negative, the value of f(pst1)−f(pk1) becomes larger as the positive time offset increases. Although the value of f(pre1)−f(pk1) is initially negative, the value of f(pre1)−f(pk1) also becomes larger as the positive time offset increases. Conversely, as shown by the dotted line in FIG. 4, if the time offset estimation model starts to have a negative time offset, the time indices pk, pre, and pst all move to the right and move to the positions of pk2, pre2, and pst2, respectively, wherein the positions of pk2, pre2, and pst2 correspond to the cross-correlation operation absolute result values f(pk2), f(pre2), and f(pst2), respectively. At this time, as the negative time offset increases, the values of f(pk2) and f(pst2) become smaller, and the value of f(pre2) becomes larger; as a result, the value of f(pst2)−f(pre2) starts to become smaller.

Hence, when the time offset estimation model is determined as the "Λ" type, for a symbol, the selection circuit 1052 finds a first cross-correlation operation absolute result value f(pre) that appears before a maximum peak value (i.e. a maximum cross-correlation operation absolute result value) in the N cross-correlation operation absolute result values and a second cross-correlation operation absolute result value f(pst) that appears after the maximum peak value in the N cross-correlation operation absolute result values. Then, the processing unit 1053 uses the subtraction unit 1054 to calculate a difference value Dpst_pre between the first cross-correlation operation absolute result value and the second cross-correlation operation absolute result value, and calculates statistics of a change trend of multiple difference values corresponding to multiple difference values calculated from multiple symbols, to determine an actual time offset direction and a time offset amount, wherein the difference value Dpst_pre is equal to the second cross-correlation operation absolute result value minus the first cross-correlation operation absolute result value (i.e. the value of f(pst)−f(pre), but not limited thereto). When the difference value Dpst_pre becomes larger, the time offset estimation model is determined to have, for example, a positive time offset. When the difference value Dpst_pre becomes smaller, the time offset estimation model is determined to have, for example, a negative time offset. It should be note that the present invention is not limited thereto.

When the time offset estimation model is determined as the right "N" type, for a symbol, the selection circuit 1052 finds a first cross-correlation operation absolute result value f(pre) that appears before a maximum peak value in the N cross-correlation operation absolute result values and a second cross-correlation operation absolute result value f(pst) that appears after the maximum peak value in the N cross-correlation operation absolute result values. Then, the processing unit 1053 uses the subtraction unit 1054 to calculate a difference value Dpst_pre between the first cross-correlation operation absolute result value and the second cross-correlation operation absolute result value, a difference value Dpst_pk between the second cross-correlation operation absolute result value and the maximum peak value, and a difference value Dpre_pk between the first cross-correlation operation absolute result value and the maximum peak value, wherein the difference value Dpst_pk is equal to the second cross-correlation operation absolute result value minus the maximum peak value (i.e. the value of f(pst)−f(pk)), and the difference value Dpre_pk is equal to the first cross-correlation operation absolute result value minus the maximum peak value (i.e. the value of f(pre)−f(pk)). When the difference value Dpst_pre becomes larger, the time offset estimation model is determined to have, for example, a positive time offset. When the difference value Dpst_pk and the difference value Dpre_pk become larger, the time offset estimation model is determined to have, for example, a negative time offset. It should be note that the present invention is not limited thereto.

When the time offset estimation model is determined as the left "N" type, for a symbol, the selection circuit 1052 finds a first cross-correlation operation absolute result value f(pre) that appears before a maximum peak value in the N cross-correlation operation absolute result values and a second cross-correlation operation absolute result value f(pst) that appears after the maximum peak value in the N cross-correlation operation absolute result values. Then, the processing unit 1053 uses the subtraction unit 1054 to calculate a difference value Dpst_pre between the first cross-correlation operation absolute result value and the second cross-correlation operation absolute result value, a difference value Dpst_pk between the second cross-correlation operation absolute result value and the maximum peak value, and a difference value Dpre_pk between the first cross-correlation operation absolute result value and the maximum peak value, wherein the difference value Dpst_pk is equal to the second cross-correlation operation absolute result value minus the maximum peak value, and the difference value Dpre_pk is equal to the first cross-correlation operation absolute result value minus the maximum peak value. When the difference value Dpst_pre becomes larger, the time offset estimation model is determined to have, for example, a negative time offset. When the difference value Dpst_pk and the difference value Dpre_pk become larger, the time offset estimation model is determined to have, for example, a positive time offset. It should be note that the present invention is not limited thereto.

Hence, the processing unit 1053 determines an actual time offset direction and a time offset amount by calculating, for example, statistics of a change trend of difference value corresponding to multiple difference values calculated from M symbols, wherein the value of M is larger than 1. In practice, for the time offset estimation model determined as the "Λ" type, the processing unit 1053 uses the accumulation unit 1055 to accumulate, for example, the difference value Dpst_pre calculated and obtained from each symbol of the M symbols, to obtain an accumulation result value. Then, the smoothing operation unit 1056 is used to perform a smoothing operation upon the accumulation result value according to a smooth factor, to make the determination operation unit 1057 determine and generate a final estimated time offset value according to the smoothing operation result, wherein the final estimated time offset value is outputted to the time offset compensation circuit 110, and the time offset compensation circuit 110 uses the final estimated time offset value as a time offset amount to perform time offset compensation upon the inputted time-domain signal. Similarly, for the time offset estimation model determined as the right "N" type, the accumulation unit 1055 obtains three accumulation result values by accumulating, for example, the difference value Dpst_pre, the difference value Dpst_pk, and the difference value Dpre_pk, respectively, wherein the difference value Dpst_pre, the difference value Dpst_pk, and the difference value Dpre_pk are calculated and obtained from each symbol of the M symbols. Then, the smoothing operation unit 1056 respectively performs the smoothing operation upon the accumulation result values according to at least one smooth factor, to make the determination operation unit 1057 determine and generate a final estimated time offset value according to the smoothing operation result, wherein the final estimated time offset value is outputted to the time offset compensation circuit 110, and the time offset compensation circuit 110 uses the final estimated time offset value as a time offset amount to perform time offset compensation upon the inputted time-domain signal. Similarly, for the time offset estimation model determined as the left "N" type, the accumulation unit 1055 obtains three accumulation result values by accumulating, for example, the difference value Dpst_pre, the difference value Dpst_pk, and the difference value Dpre_pk, respectively, wherein the difference value Dpst_pre, the difference value Dpst_pk, and the difference value Dpre_pk are calculated and obtained from each symbol of the M symbols. Then, the smoothing operation unit 1056 respectively performs the smoothing operation upon the accumulation result values according to at least one smooth factor, to make the determination operation unit 1057 determine and generate a final estimated time offset value according to the smoothing operation result, wherein the final estimated time offset value is outputted to the time offset compensation circuit 110, and the time offset compensation circuit 110 uses the final estimated time offset value as a time offset amount to perform time offset compensation upon the inputted time-domain signal.

Figure 5:
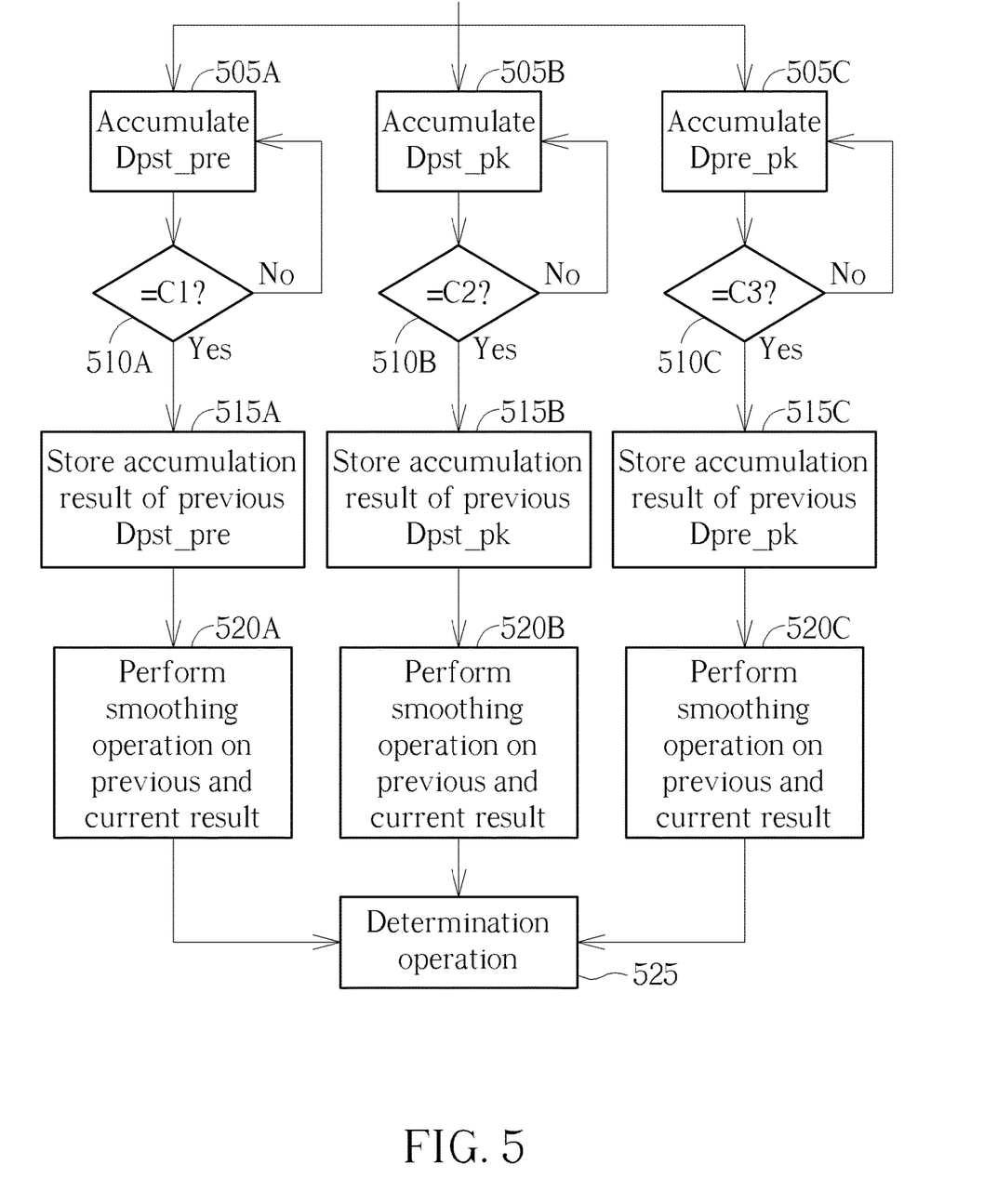
FIG. 5 is a flowchart illustrating the smoothing operation, performed by the smoothing operation unit shown in FIG. 1, upon the accumulation result values according to at least one smooth factor to determine and generate a final estimated time offset value according to an embodiment of the present invention.

Please refer to FIG. 5. FIG. 5 is a flowchart illustrating the smoothing operation performed, by the smoothing operation unit 1056, upon the accumulation result values according to at least one smooth factor to determine and generate a final estimated time offset value according to an embodiment of the present invention. As shown in FIG. 5, when the flow starts, Steps 505A, 505B, and 505C are performed, respectively. In Step 505A, the difference value Dpst_pre calculated and obtained from the current processed symbol is accumulated. In Step 510A, it is determined whether the number of symbols currently accumulated and processed is equal to C1. If the number of symbols currently accumulated and processed is equal to C1, the flow proceeds with the next step to start the smoothing process, otherwise the flow returns to Step 505A to continue accumulating the difference value Dpst_pre calculated and obtained from the next processed symbol. In Step 515A, the accumulation result Dpst_ pre acct calculated in response to the previous difference value Dpst_pre is first stored as a reference result value Dpst_pre_ref. Then, in Step 520A, the smoothing operation is performed. The formula is as follows: Dpst_pre_s=Dpst_pre acc2×FSA+Dpst_pre_ref×(1−FSA), wherein FSA is a smooth factor smaller than 1, Dpst_pre_s is the final difference value accumulation result, and Dpst_pre acc2 is the accumulation result calculated in response to the current difference value Dpst_pre.

Similarly, in Step 505B, the difference value Dpst_pk calculated and obtained from the current processed symbol is accumulated. In Step 510B, it is determined whether the number of symbols currently accumulated and processed is equal to C2. If the number of symbols currently accumulated and processed is equal to C2, the flow proceeds with the next step to start the smoothing process, otherwise the flow returns to Step 505B to continue accumulating the difference value Dpst_pk calculated and obtained from the next processed symbol. In Step 515B, the accumulation result Dpst_pk_acc1 calculated in response to the previous difference value Dpst_pk is first stored as a reference result value Dpst_pk_ref. Then, in Step 520B, the smoothing operation is performed. The formula is as follows: Dpst_pk_s=Dpst_pk_acc2×FSB+Dpst_pk_ref×(1−FSB), wherein FSB is a smooth factor smaller than 1, Dpst_pk_s is the final difference value accumulation result, and Dpst_pk_acc2 is the accumulation result calculated in response to the current difference value Dpst_pk.

Similarly, in Step 505C, the difference value Dpre_pk calculated and obtained from the current processed symbol is accumulated. In Step 510C, it is determined whether the number of symbols currently accumulated and processed is equal to C3. If the number of symbols currently accumulated and processed is equal to C3, the flow proceeds with the next step to start the smoothing process, otherwise the flow returns to Step 505C to continue accumulating the difference value Dpre_pk calculated and obtained from the next processed symbol. In Step 515C, the accumulation result Dpre_pk_acc1 calculated in response to the previous difference value Dpre_pk is first stored as a reference result value Dpre_pk_ref. Then, in Step 520C, the smoothing operation is performed. The formula is as follows: Dpre_pk_s=Dpre_pk_acc2×FSC+Dpre_pk_ref×(1−FSC), wherein FSC is a smooth factor smaller than 1, Dpre_pk_s is the final difference value accumulation result, and Dpre_pk_acc2 is the accumulation result calculated in response to the current difference value Dpre_pk.

The final difference value accumulation results Dpst_pre_s, Dpst_pk_s, and Dpre_pk_s are outputted to the Step 525 in which the determination operation unit 1057 performs the determination operation to determine whether the current time offset estimation model has a time offset. If the current time offset estimation model has a time offset, it is determined whether the time offset is a positive time offset or a negative time offset. Then, a time offset compensation amount is determined.

Figure 6:
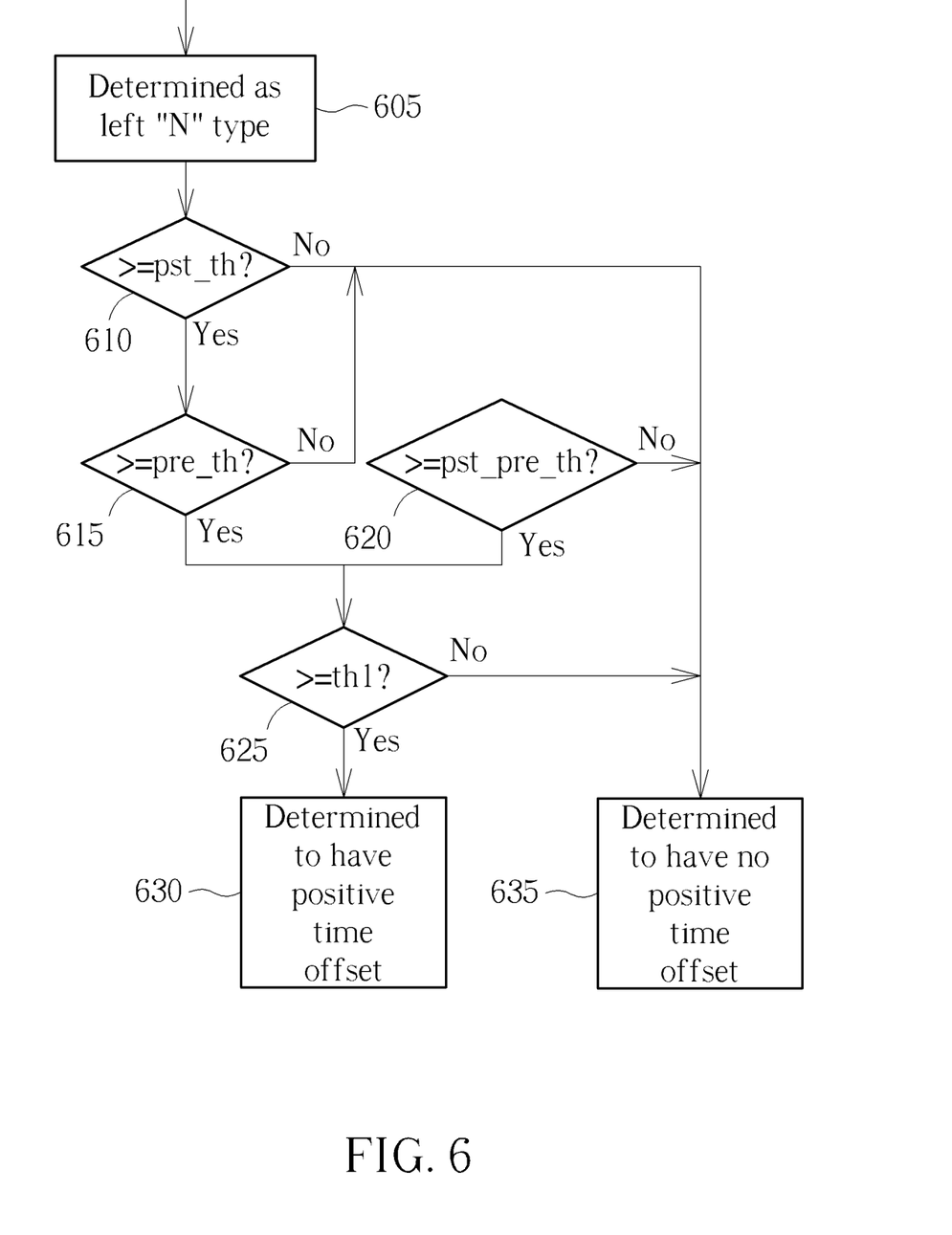
FIG. 6 is a flowchart illustrating that, when the time offset estimation model is the left "N" type, the determined operation unit shown in FIG. 1 determines whether the time offset estimation model has the positive time offset according to an embodiment of the present invention.
Figure 7:
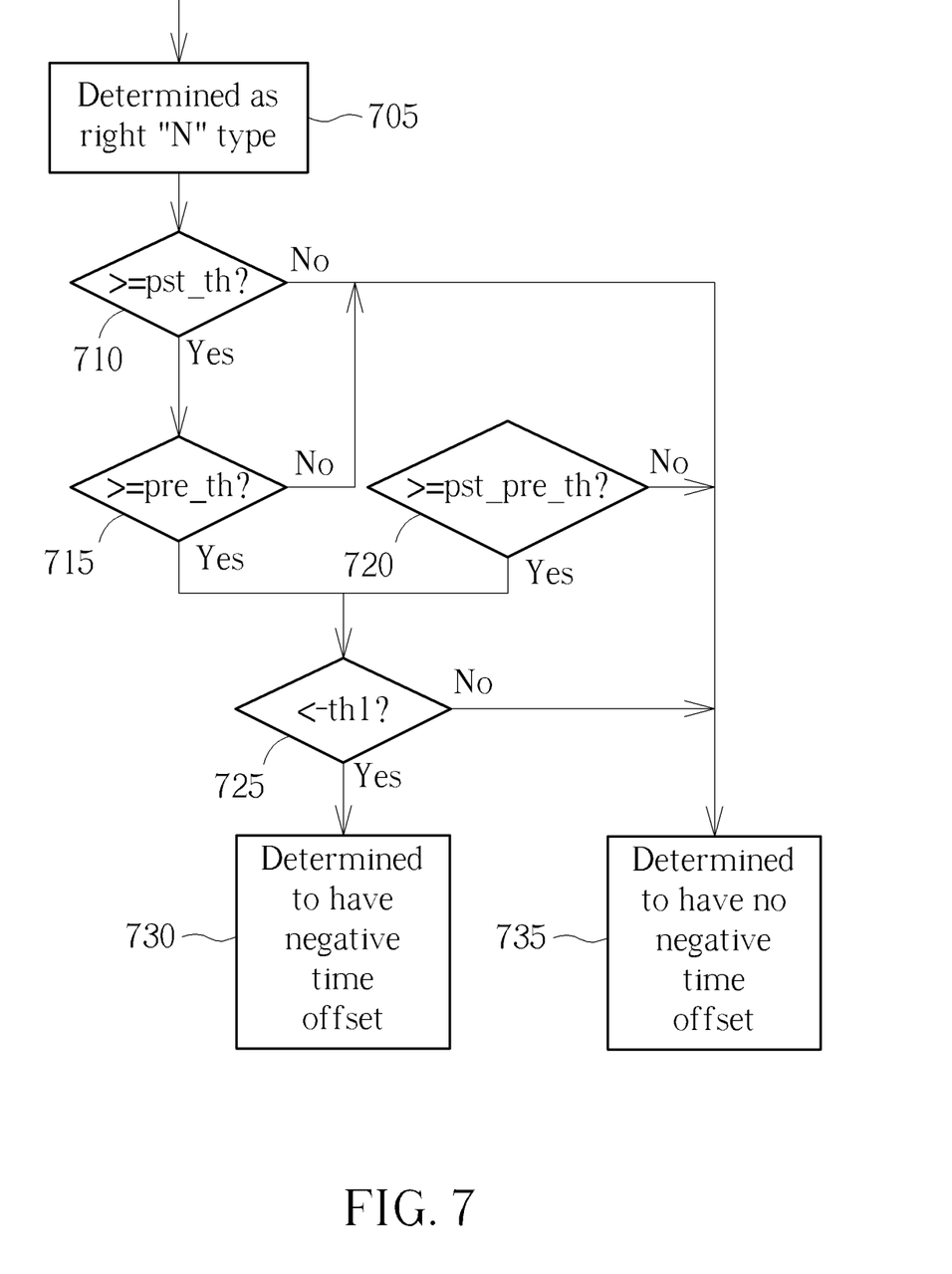
FIG. 7 is a flowchart illustrating that, when the time offset estimation model is the right "N" type, the determined operation unit shown in FIG. 1 determines whether the time offset estimation model has the negative time offset according to an embodiment of the present invention.

Please refer to FIGS. 6 and 7. FIG. 6 is a flowchart illustrating that, when the time offset estimation model is the left "N" type, the determination operation unit 1057 determines whether the time offset estimation model has the positive time offset according to an embodiment of the present invention. FIG. 7 is a flowchart illustrating that, when the time offset estimation model is the right "N" type, the determination operation unit 1057 determines whether the time offset estimation model has the negative time offset according to an embodiment of the present invention. As shown in FIG. 6, the current time offset estimation model is determined as, for example, the left "N" type in Step 605, and then the flow proceeds with Step 610. In Step 610, a difference value between the above-mentioned final difference value accumulation result Dpst_pk_s and the previous difference value accumulation result Dpst_pk_ref is calculated, and whether the difference value is larger than a threshold value pst_th is checked. If the difference is larger than or equal to the threshold value pst_th, the flow proceeds with Step 615; otherwise, the flow proceeds with Step 635, and determines that the positive time offset does not occur at this moment. In Step 615, a difference value between the above-mentioned final difference value accumulation result Dpre_pk_s and the previous difference value accumulation result Dpre_pk_ref is calculated, and whether the difference value is larger than a threshold value pre_th is checked. If the difference value is larger than or equal to the threshold value pre_th, the flow proceeds with Step 625; otherwise, the flow proceeds with Step 635, and determines that the positive time offset does not occur at this moment. Simultaneously, Step 620 is executed to calculate a difference value between the above-mentioned final difference value accumulation result Dpst_pre_s and the previous difference value accumulation result Dpst_pre_ref, and determines whether the difference value is larger than a threshold value pst_pre_th. If the difference value is larger than or equal to the threshold value pst_pre_th, the flow proceeds with Step 625; otherwise, the flow proceeds with Step 635, and determines that the positive time offset does not occur at this moment. When the flow proceeds with Step 625 due to one or both of Step 615 and Step 620, a result value that is equal to Dpst_pre obtained currently minus Dpst_pre obtained previously is calculated in Step 625, and whether the result value is larger than a threshold value th1 is checked in Step 625. If the result value is larger than or equal to the threshold value th1, the flow proceeds with Step 630, and determines that the current time offset estimation model has the positive time offset, such as one offset (which is a time unit, but the present invention is not limited thereto) to the right; otherwise, the flow proceeds with Step 635, and determines that the positive time offset does not occur at this moment.

Similarly, as shown in FIG. 7, the current time offset estimation model is determined as, for example, the right "N" type (Step 705), and then the flow proceeds with Step 710. In Step 710, a difference value between the above-mentioned final difference value accumulation result Dpst_pk_s and the previous difference value accumulation result Dpst_pk_ref is calculated, and whether the difference value is larger than a threshold value pst_th is checked. If the difference is larger than or equal to the threshold value pst_th, the flow proceeds with Step 715; otherwise, the flow proceeds with Step 735, and determines that the positive time offset does not occur at this moment. In Step 715, a difference value between the above-mentioned final difference value accumulation result Dpre_pk_s and the previous difference value accumulation result Dpre_pk_ref is calculated, and whether the difference value is larger than a threshold value pre_th is checked. If the difference value is larger than or equal to the threshold value pre_th, the flow proceeds with Step 725; otherwise, the flow proceeds with Step 735, and determines that the positive time offset does not occur at this moment. Simultaneously, Step 720 is executed to calculate a difference value between the above-mentioned final difference value accumulation result Dpst_pre_s and the previous difference value accumulation result Dpst_pre_ref, and determines whether the difference value is larger than a threshold value pst_pre_th. If the difference value is larger than or equal to the threshold value pst_ pre_th, the flow proceeds with Step 725; otherwise, the flow proceeds with Step 735, and determines that the positive time offset does not occur at this moment. When the flow proceeds with Step 725 due to one or both of Step 715 and Step 720, a result value that is equal to Dpst_pre obtained currently minus Dpst_pre obtained previously is calculated in Step 725, and whether the result value is larger than a negative threshold value th1 (i.e. −th1) is checked in Step 725. If the result value is smaller than −th1, the flow proceeds with Step 730, and determines that the current time offset estimation model has the negative time offset, such as one offset (which is a time unit, but the present invention is not limited thereto) to the left; otherwise, the flow proceeds with Step 735, and determines that the negative time offset does not occur at this moment.

In the above-mentioned embodiments, the threshold values pre_th, pst_th, and pst_pre_th have a certain degree of correlation with the smooth factor. For example, if the smooth factor is equal to $\frac{1}{32}$, the threshold values pre_th and pst_th may be set within the range of, for example, 0.02 to 2, and the threshold value pst_pre_th may be set to a value in the range of, for example, 0.01 to 0.3. In addition, the threshold value th1 is arranged to avoid misjudgment when the time offset is small. The threshold value th1 corresponds to the number of symbols (i.e. the above-mentioned M value) of each accumulation process. For example, if the value of M is equal to 22, the threshold value th1 may be set to a value in the range of 2 to 10. The above alternative embodiments are not meant to be limitations of the present invention.

Figure 8:
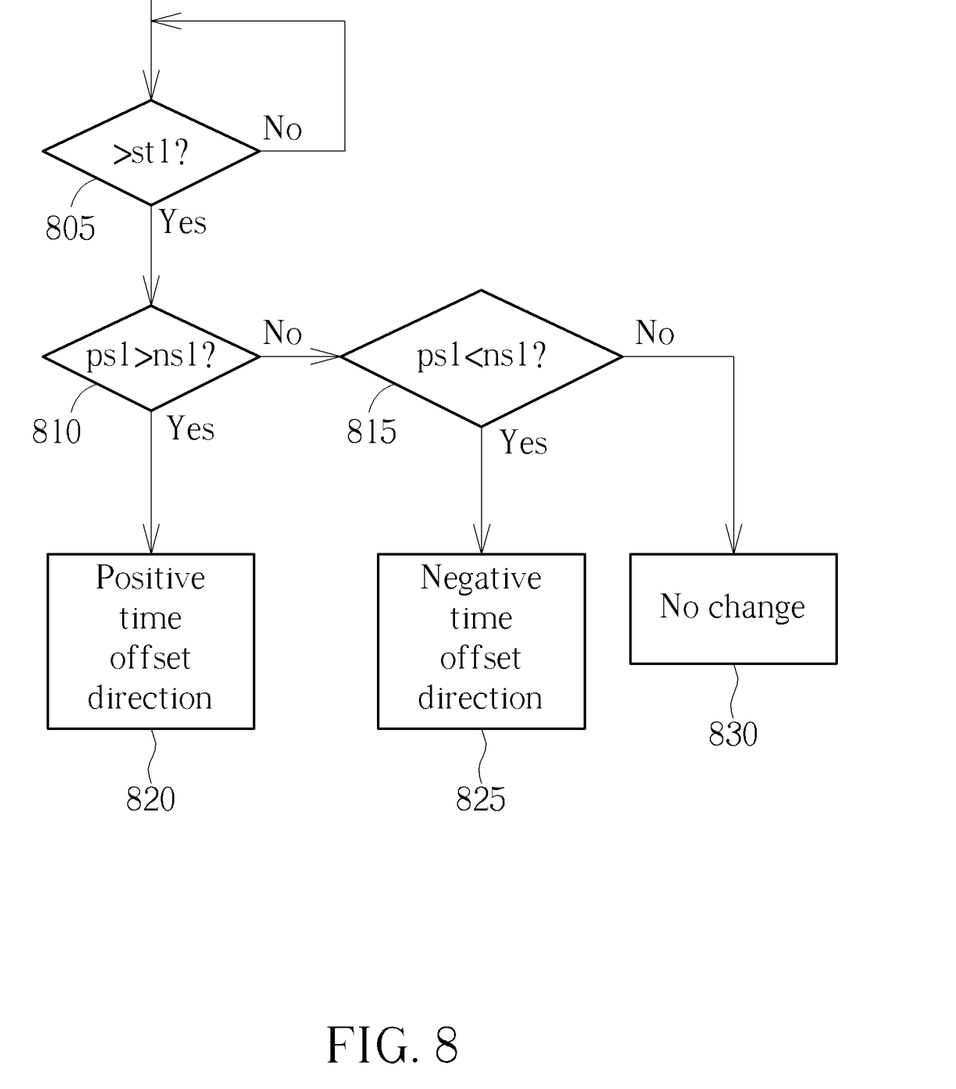
FIG. 8 is a flowchart illustrating an operation of finally determining the time offset direction by calculating statistics of time offset determination results generated at different time instants according to an embodiment of the present invention.

In addition, the determination operation unit 1057 in the embodiment of the present invention may also calculate statistics of time offset determination results generated at different time instants to finally determine whether the time offset is positive or negative. Please refer to FIG. 8. FIG. 8 is a flowchart illustrating an operation of finally determining the time offset direction by calculating statistics of time offset determination results generated at different time instants according to an embodiment of the present invention. If a total number of times (which is a sum of the number of times the time offset determination result is determined as the positive time offset and the number of times the time offset determination result is determined as the negative time offset) exceeds a threshold value st1, the determination operation unit 1057 may mandatorily (or auxiliarily) determines that the time offset determination result corresponding to the subsequent symbol has the time offset direction with the largest number of times, wherein the threshold value st1 may be set a value within a range of, for example, 3 to 20, and the threshold value st1 may be adjusted according to the length of the signal. In implementation as shown in FIG. 8, in Step 805, the determination operation unit 1057 accumulates a number of times ps1 of occurrence of the positive time offset determination result and a number of times ns1 of occurrence of the negative time offset determination result to obtain a total number of times. When the total number of times is smaller than the threshold value st1, Step 805 is performed again. When the total number of times is larger than the threshold value st1, the flow proceeds with Step 810. In Step 810, whether the total number of times ps1 of occurrence of the positive time offset determination result is larger than the total number of times ns1 of occurrence of the negative time offset determination result is checked. If the total number of times ps1 of occurrence of the positive time offset determination result is larger, the flow proceeds with Step 820. In Step 820, it is mandatory to determine the subsequent time offset result as a positive time offset direction. If the total number of times ns1 of occurrence of the negative time offset determination result is larger, the flow proceeds with Step 815 and Step 825 in order. In Step 825, it is mandatory to determine the subsequent time offset result as a negative time offset direction. If the total number of times ps1 of occurrence of the positive time offset determination result is equal to the total number of times ns1 of occurrence of the negative time offset determination result, the flow proceeds with Step 815 and Step 830 in order. In step 830, it is mandatory to determine that the direction of the current time offset has no obvious change.

It should be noted that, in the above-mentioned embodiments, even if the found or identified symbol boundary is not accurate, the proposed method of the present invention may still be employed to track change of the direction of the current time offset for estimating the time offset amount that needs to be compensated. In addition, the proposed time offset compensation estimation method of the present invention may estimate the signal of only one of receiver paths in the receiver circuit, or may estimate the signal of each of receiver paths in the receiver circuit. However, this is not meant to be a limitation of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A receiver circuit, comprising:
   an estimation circuit, arranged to perform a cross-correlation operation upon at least one time-domain signal on at least one receiver path of the receiver circuit according to a local sequence signal, the estimation circuit comprising:
      a cross-correlation operation circuit unit, arranged to use the local sequence signal to perform the cross-correlation operation upon the at least one time-domain signal on the at least one receiver path of the receiver circuit, to generate a cross-correlation operation absolute result signal for each symbol of the at least one time-domain signal, where the cross-correlation operation absolute result signal comprises N cross-correlation operation absolute result values;
      a selection circuit unit, coupled to the cross-correlation operation circuit unit, wherein for the each symbol, the selection circuit unit is arranged to select multiple specific cross-correlation operation absolute result values from the N cross-correlation operation absolute result values, and determine multiple time indices corresponding to the multiple specific cross-correlation operation absolute result values, respectively; an offset of a time index of a selected specific cross-correlation operation absolute result value corresponds to a time offset amount; and
      a processing circuit unit, coupled to the selection circuit unit, and arranged to calculate statistics of change of at least one difference of the multiple specific cross-correlation operation absolute result values selected from different symbols, to determine a time offset direction, and to use the time offset amount and the time offset direction to obtain at least one final time offset amount as at least one time offset compensation amount; and a time offset compensation circuit, coupled to the estimation circuit, and arranged to perform time offset compensation upon the at least one time-domain signal on the at least one receiver path according to the at least one time offset compensation amount.

2. The receiver circuit of claim 1, wherein the multiple specific cross-correlation operation absolute result values comprise a maximum cross-correlation operation absolute result value with a maximum peak value, a first cross-correlation operation absolute result value before the maximum cross-correlation operation absolute result value, and a second cross-correlation operation absolute result value after the maximum cross-correlation operation absolute result value.

3. The receiver circuit of claim 2, wherein the first cross-correlation operation absolute result value and the second cross-correlation operation absolute result value are cross-correlation operation absolute result values with local peak values, respectively.

4. The receiver circuit of claim 2, wherein a time difference between a first time index corresponding to the first cross-correlation operation absolute result value and a time index corresponding to the maximum cross-correlation operation absolute result value is equal to a time difference between a second time index corresponding to the second cross-correlation operation absolute result value and the time index corresponding to the maximum cross-correlation operation absolute result value.

5. The receiver circuit of claim 2, wherein the processing circuit unit comprises:
a subtraction circuit unit, wherein for the each symbol, the subtraction circuit unit is arranged to refer to the maximum cross-correlation operation absolute result value, the first cross-correlation operation absolute result value, and the second cross-correlation operation absolute result value, to generate a first difference value between the first cross-correlation operation absolute result value and the second cross-correlation operation absolute result value, generate a second difference value between the first cross-correlation operation absolute result value and the maximum cross-correlation operation absolute result value, and generate a third difference value between the second cross-correlation operation absolute result value and the maximum cross-correlation operation absolute result value;
an accumulation circuit unit, coupled to the subtraction circuit unit, and arranged to accumulate first difference values calculated and obtained from multiple symbols to generate a first difference value accumulation result, accumulate second difference values calculated and obtained from the multiple symbols to generate a second difference value accumulation result, and accumulate third difference values calculated and obtained from the multiple symbols to generate a third difference value accumulation result;
a smoothing operation circuit unit, coupled to the accumulation circuit unit, and arranged to perform smoothing operations upon multiple first difference value accumulation results, multiple second difference value accumulation results, and multiple third difference value accumulation results to generate multiple final difference value accumulation results, respectively; and
a determination operation circuit unit, coupled to the smoothing operation circuit unit, and arranged to determine the time offset direction according to the multiple final difference value accumulation results and then to use the determined time offset direction and the time offset amount corresponding to the offset of the time index to obtain the at least one final time offset amount.

6. The receiver circuit of claim 5, wherein the determination operation circuit unit determines the time offset direction further according to a type of a current time offset estimation model and the multiple final difference value accumulation results.

7. The receiver circuit of claim 5, wherein the determination operation circuit unit is arranged to determine the time offset direction by further calculating statistics of numbers of previously-determined time offset directions.

8. A method applicable to a receiver circuit, comprising:
performing a cross-correlation operation upon at least one time-domain signal on at least one receiver path of the receiver circuit according to a local sequence signal, to estimate at least one time offset amount of the at least one time-domain signal as at least one time offset compensation amount, and performing the cross-correlation operation comprises: using the local sequence signal to perform the cross-correlation operation upon the at least one time-domain signal on the at least one receiver path of the receiver circuit, to generate a cross-correlation operation absolute result signal for each symbol of the at least one time-domain signal, where the cross-correlation operation absolute result signal comprises N cross-correlation operation absolute result values;
for the each symbol, selecting multiple specific cross-correlation operation absolute result values from the N cross-correlation operation absolute result values, and determining multiple time indices corresponding to the multiple specific cross-correlation operation absolute result values, respectively; an offset of a time index of a selected specific cross-correlation operation absolute result value corresponds to a time offset amount;
calculating statistics of change of at least one difference of the multiple specific cross-correlation operation absolute result values selected from different symbols, to determine a time offset direction;
using the time offset amount and the time offset direction to obtain at least one final time offset amount as at least one time offset compensation amount; and
performing time offset compensation upon the at least one time-domain signal on the at least one receiver path according to the at least one time offset compensation amount.

9. The method of claim 8, wherein the multiple specific cross-correlation operation absolute result values comprise a maximum cross-correlation operation absolute result value with a maximum peak value, a first cross-correlation operation absolute result value before the maximum cross-correlation operation absolute result value, and a second cross-correlation operation absolute result value after the maximum cross-correlation operation absolute result value.

10. The method of claim 9, wherein the first cross-correlation operation absolute result value and the second cross-correlation operation absolute result value are cross-correlation operation absolute result values with local peak values, respectively.

11. The method of claim 9, wherein a time difference between a first time index corresponding to the first cross-correlation operation absolute result value and a time index corresponding to the maximum cross-correlation operation absolute result value is equal to a time difference between a second time index corresponding to the second cross-correlation operation absolute result value and the time index corresponding to the maximum cross-correlation operation absolute result value.

12. The method of claim 9, further comprising:
for the each symbol, referring to the maximum cross-correlation operation absolute result value, the first cross-correlation operation absolute result value, and the second cross-correlation operation absolute result value, to generate a first difference value between the first cross-correlation operation absolute result value and the second cross-correlation operation absolute result value, generate a second difference value between the first cross-correlation operation absolute result value and the maximum cross-correlation operation absolute result value, and generate a third difference value between the second cross-correlation operation absolute result value and the maximum cross-correlation operation absolute result value;
accumulating first difference values calculated and obtained from multiple symbols to generate a first difference value accumulation result, accumulating second difference values calculated and obtained from the multiple symbols to generate a second difference value accumulation result, and accumulating third difference values calculated and obtained from the multiple symbols to generate a third difference value accumulation result;
performing smoothing operations upon multiple first difference value accumulation results, multiple second difference value accumulation results, and multiple third difference value accumulation results to generate multiple final difference value accumulation results, respectively;
determining the time offset direction according to the multiple final difference value accumulation results; and
using the determined time offset direction and the time offset amount corresponding to the offset of the time index to obtain the at least one final time offset amount.

13. The method of claim 12, wherein the time offset direction is determined further according to a type of a current time offset estimation model.

14. The method of claim 12, wherein the time offset direction is determined by further calculating statistics of numbers of previously-determined time offset directions.

* * * * *